United States Patent

Clostermeyer et al.

[11] Patent Number: 5,134,839
[45] Date of Patent: Aug. 4, 1992

[54] ROUND-BALE PRESS FOR STALK-SHAPED CROPS

[75] Inventors: Gerhard Clostermeyer, Guetersloh; Werner Koenekamp, Herzebrock, both of Fed. Rep. of Germany

[73] Assignee: Claas OHG, Harsewinkel, Fed. Rep. of Germany

[21] Appl. No.: 624,645

[22] Filed: Dec. 10, 1990

[30] Foreign Application Priority Data

Dec. 18, 1989 [DE] Fed. Rep. of Germany ....... 3941707

[51] Int. Cl.$^5$ .............................................. A01D 39/00
[52] U.S. Cl. .......................................... 56/341; 100/88
[58] Field of Search ................... 56/341, 342; 100/88, 100/89

[56] References Cited

U.S. PATENT DOCUMENTS

| | | | |
|---|---|---|---|
| 3,837,159 | 9/1974 | Vermeer | 56/341 |
| 3,847,073 | 11/1974 | Mast et al. | 100/88 |
| 3,895,573 | 7/1975 | Phillips et al. | 56/341 X |
| 3,914,926 | 10/1975 | Braunberger et al. | 56/341 |
| 3,931,702 | 1/1976 | Soteropulos et al. | 56/341 |
| 4,121,513 | 10/1978 | Kopaska | 100/88 |
| 4,273,036 | 6/1981 | Kopaska | 100/88 |
| 4,597,254 | 7/1986 | Bowden, Jr. | 56/341 |
| 4,765,237 | 8/1988 | Vansteelant et al. | 100/89 |
| 4,765,238 | 8/1988 | De Busscher et al. | 100/89 |

FOREIGN PATENT DOCUMENTS

| | | |
|---|---|---|
| 0235787 | 9/1987 | European Pat. Off. |
| 0296665 | 12/1988 | European Pat. Off. |
| 0339730 | 11/1989 | European Pat. Off. |
| 2723763 | 12/1977 | Fed. Rep. of Germany |
| 3232124 | 3/1983 | Fed. Rep. of Germany |
| 2460099 | 1/1981 | France |

*Primary Examiner*—Terry Lee Melius
*Attorney, Agent, or Firm*—Spencer, Frank & Schneider

[57] ABSTRACT

A round-bale press for stalk-shaped crops has a pick-up and a press space which, on its circumference, is limited downwards by a rearwardly conveying ground arrangement, rearwards by the upwardly travelling front strand of a press-band arrangement, and forwards by a downwardly travelling movable wall arrangement. A transverse roller is provided which is movable and by which the front strand can be pressed forwards at the start of formation of a bale.

12 Claims, 3 Drawing Sheets

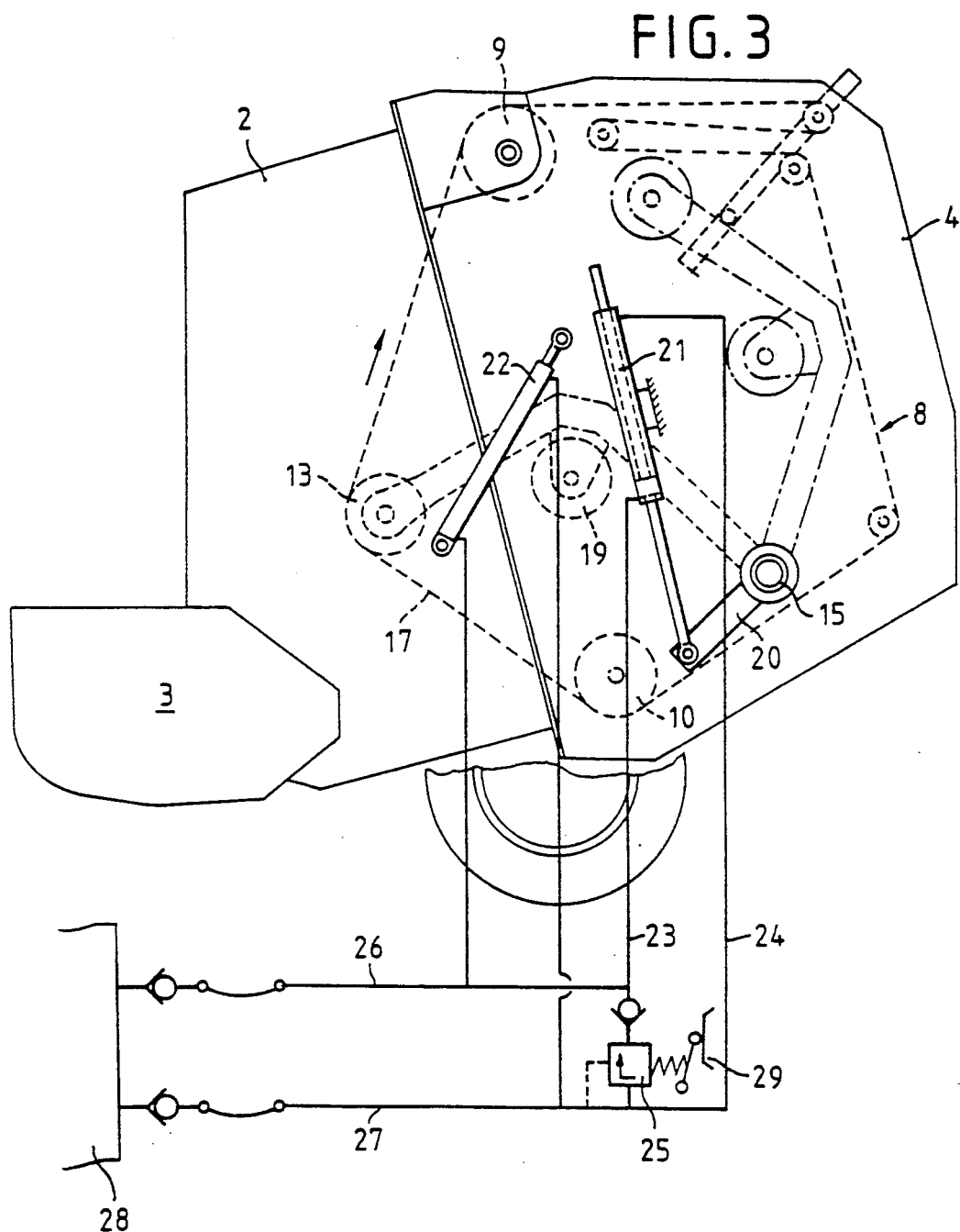

ROUND-BALE PRESS FOR STALK-SHAPED CROPS

BACKGROUND OF THE INVENTION

1. Field of the Invention

The invention relates to a round-bale press for stalk-shaped crops.

2. Background Information

Round-bale presses of this type are known, for example, from European Patent Application 235,787 or 296,665. In these, at the start of winding of the bale the press chamber has, in longitudinal section, approximately the form of a segment of a circle, the chord being formed by the front strand, inclined only slightly forwards relative to the vertical, of a pressband arrangement, and the circle arc being formed by a series of rollers arranged with fixed axles. In the examples mentioned from the state of the art and also in the subject of the application, the press-band arrangement consists of a plurality of endless belts or bands rotating at mutual distances next to one another. However, the concept also embraces corresponding arrangements of chains, ropes or similar lines.

The press space of these known round-bale presses is limited downwards by a pick-up roller or by this and a ground roller additionally conveying rearwards. The inlet orifice for the crop to be pressed is located between this ground arrangement and the bottommost roller of the front termination having the form of an arc of a circle. With increasing bale size, the press-band arrangement shifts aside rearwards. Finally, the bale is discharged by opening a rear flap, on which the deflecting roll or rollers of the pressband arrangement are mounted.

In these known round-bale presses, the empty press space is relatively large, and therefore the initial bale is formed in a more or less "uncontrolled" manner and only after a relatively large quantity of the crop for pressing has been introduced. Too little volume pressing consequently occurs in the central region of the bale, and the result of this can be that the latter is not truly circular or loses its shape during subsequent transportation and stacking.

It is known from European Patent Application 339,730 to reduce the initial press space by designing the roller arrangement forming the front circumferential limitation of the press space so as to be pivotable forwards and backwards about one of the lower roller axles. The roller arrangement has an upper non-driven roller which runs behind the front strand of the pressband arrangement, so that the pivotable roller arrangement is suspended on the said strand and, when the latter is stretched at the start of formation of the bale, is inclined rearwards towards the interior of the press chamber and reduces this. However, the roll formation is only slightly assisted thereby, since a true rotation of the crop for pressing occurs only when a particular internal pressure has built up in the reduced press chamber as a result of the quantity of crop introduced.

Finally, it is known from prospectuses of the Italian firm of L. Sgorbati, instead of rolls, to arrange in groups fixed conveyor bands running over at least two deflecting rollers, for the front and lower circumferential limitation of the press space.

SUMMARY OF THE INVENTION

It is therefore an object of the invention to improve a round-bale press of the type designated in the introduction, to the effect that bales with a more uniform structure and a perfectly round outer shape can be produced by relatively simple additional means.

According to the invention, this object is achieved in that a transverse roller is provided which is arranged so as to be movable in parallel and by means of which the front strand of the press-band arrangement can be pressed forwards at the start of formation of the bale. Thus, not the front rigid, but the rear flexible limitation of the press space is used for reducing the latter. The said strand of the pressband arrangement, which can consist of bands, chains, ropes or the like, is gabled forwards by the pressure of the free-running horizontal transverse roller. As a result the crop stream introduced from the front rearwards experiences, immediately it strikes the strand, a deflection virtually in the opposite direction. Under the effect of the crop further conveyed after it, therefore, a rolling-up operation already commences at a very early stage, and it may be stated at the same time that the strand shortened by means of the transverse roller can advantageously exert, especially in the vicinity of the transverse roller, a much greater pressing on the roll being formed than the strand of the known presses which is stretched over the entire machine height.

In an embodiment of the invention, the ground arrangement has conveying rollers, especially two in number, mounted in succession, and that the lower portion of the front strand extending between the transverse roller and the lower deflecting roller can be inclined forwards over these conveying rollers. Thus, the initial roll is formed above the gusset produced when two rollers are used. In particular, the lower portion of the strand pressing on the roll should form an angle of approximately 30° with the axial plane of the conveying rollers.

Where the three-dimensional guidance of the transverse roller is concerned, it is especially expedient if this is received between two pivoting arms which are mounted pivotably about a transverse axle on the rear lower part of the side walls of the rear flap. At the same time, these pivoting arms can be arranged between the machine side walls or in the vicinity of these. They preferably have a shape bent upwards or rearwards and in the region of the bending points carry bearings for receiving a supporting roller. When the pivoting arms pivot backwards under the pressure of the growing bale, the front strand is laid against this supporting roller and is thus in turn additionally supported when the clearance has increased as a result of the backward pivoting. This is conducive to the true rotation and improves the pressing during the final stage of the bale formation.

So that sufficient pressure forces can be generated on the transverse roller and supporting roller, in a further embodiment the pivoting arms are connected to at least one double-acting lifting cylinder which is connected as a hydraulic brake during the growth of the bale. The braking or pressure forces can thereby be adjusted very finely by means of a pressure-limiting valve and, if desired, also controlled as a function of the pivoting angle. A further advantage of such a braking arrangement is that the lifting cylinder can also be used actively as a driving member for the pivoting arms. It is expedient, for example, to connect it hydraulically in parallel with a further lifting cylinder for actuating the rear flap, thus ensuring that, simultaneously with the closing of the rear flap, the pivoting arms assume their front position of readiness for the start of the winding operation, and that, for ejection of the bale, the pivoting arms are brought positively into their rear pivoting position during the opening of the rear flap.

BRIEF DESCRIPTION OF THE DRAWINGS

An exemplary embodiment of the invention is explained below by means of the drawings. In particular, in the drawings:

FIG. 3 shows a simplified representation of the arrangement according to FIG. 1, with the hydraulic circuit diagram of the lifting cylinders of the rear flap and the pivoting arms.

DETAILED DESCRIPTION OF THE PREFERRED EMBODIMENTS

Figure 1:
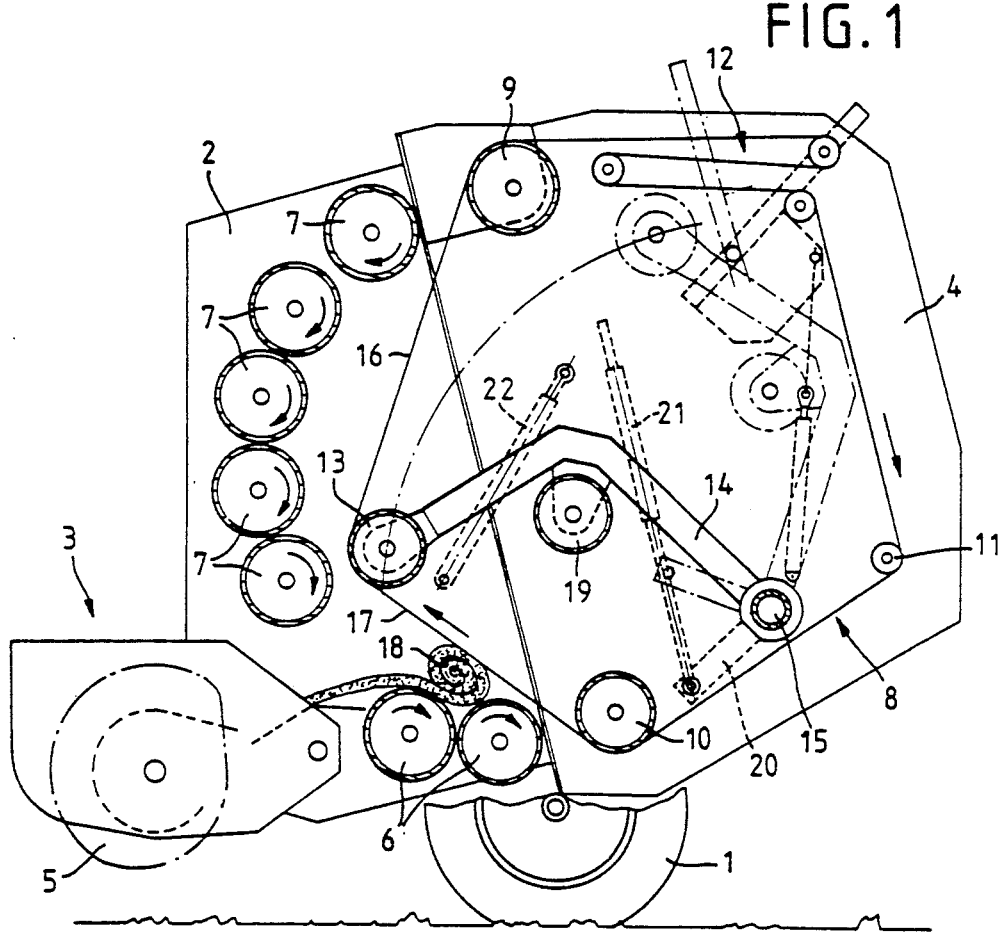
FIG. 1 shows a vertical longitudinal section through a round-bale press according to an embodiment of the invention.
Figure 2:
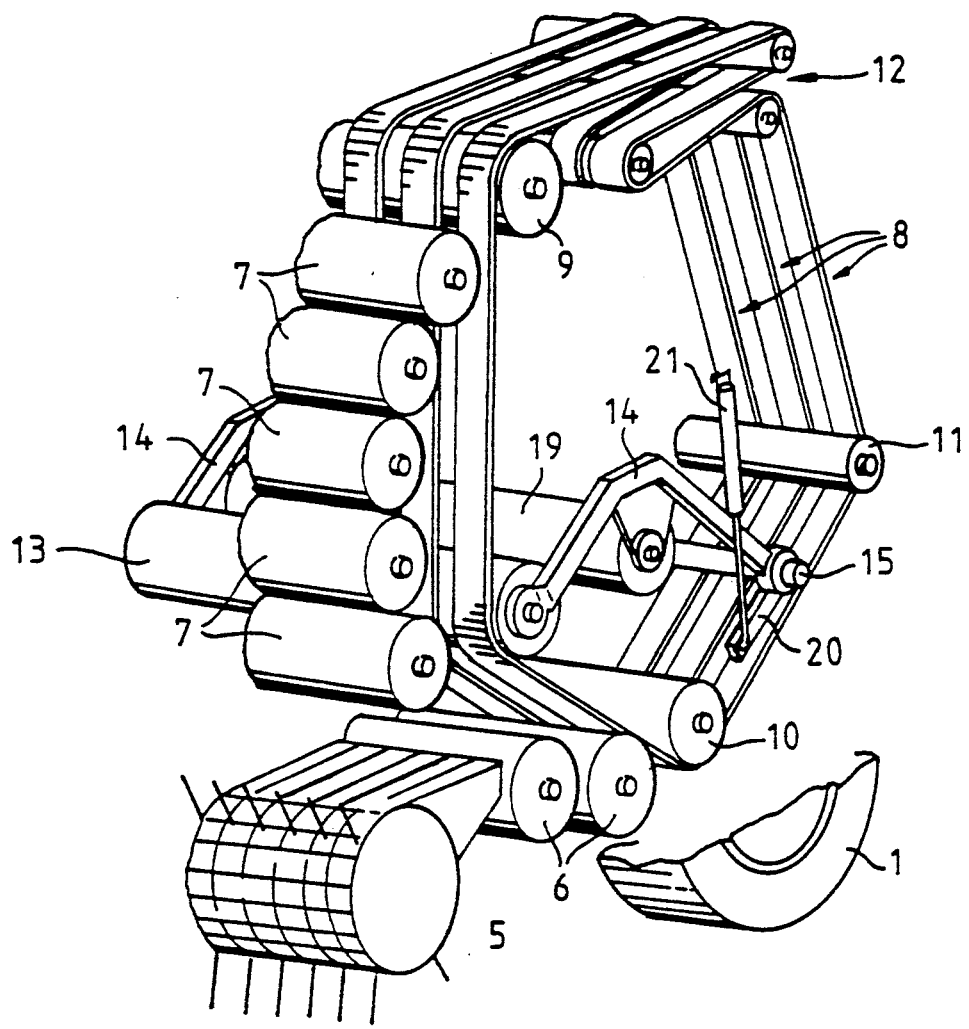
FIG. 2 shows a three-dimensional view of the essential internal parts of the press according to FIG. 1, these parts being truncated in the transverse direction to reduce their length.

The round-bale press according to FIGS. 1 and 2 has a machine frame 2 which is mounted on two running wheels 1 and is drawn by a tractor vehicle in a way not shown and which possesses at the front a pick-up 3 and at the rear an upwardly pivotable rear flap 4. The pick-up 3 of variable height picks up the crop to be pressed, for example straw, from the ground by means of its pick-up roller 5 equipped with prongs, and conveys it rearwards into the machine interior, two driven ground rollers 6 arranged behind the pick-up roller 5 also cooperating. They, like all the rollers subsequently mentioned, extend horizontally and transversely relative to the direction of travel. Their axles are in an approximately horizontal plane, and, as indicated by arrows, the direction of rotation is to the right.

In addition to the ground rollers 6 already mentioned, for the circumferential limitation of the press space there is a series of five arcuately arranged rollers 7, mounted at fixed locations in the machine frame 2 and likewise driven with their direction of rotation to the right, and a press-band arrangement consisting of a plurality of bands 8 guided at mutual distances next to one another via deflecting rollers. In a similar way to known machines of this type, the deflecting rollers for the press-band arrangement are mounted on the rear flap 4. Of importance are the two driven deflecting rollers 9 and 10 which are arranged at the top and bottom in the vicinity of the front edge of the rear flap 4 and between which, in the known presses, the front strand of the press-band arrangement is stretched freely. In addition, there are a deflecting roller 11 mounted in the rear lower region and a number of deflecting rollers which are arranged in the rear upper region of the rear flap and which, as a result of relative mobility, constitute a store 12 which provides and receives the necessary excess lengths of band during operation.

A special feature of the round-bale press to be described here is a free-running pressure roller 13 which is mounted between the ends of two bent pivoting arms 14. These pivoting arms 14 are connected to one another at the other end by means of a transverse tube 15 which is received rotatably in bearings on the rear lower parts of the side walls of the rear flap 4. In the initial position of the pivoting arms 14 and of the pressure roller 13 according to FIG. 2 (represented by unbroken lines in FIG. 1), the pressure roller 13 presses from the rear onto the front strand of the bands 8 stretched between the deflecting rollers 9 and 10 and gables this forwards, thereby forming an upper and a lower band portion 16 and 17 which are angled relative to one another. It is essential that the lower band portion 17 should extend upwards at a very low inclination from the rear forwards over the ground rollers 6. Since, as indicated by arrows, the band running direction is selected so that the bands rise forwards in the band portion 17, the crop introduced in virtually the opposite direction is bent round immediately upon first contact with the band portion 17 and is made to roll up in the form of a small roll 18 as shown in FIG. 1.

With an increasing diameter of the small bale, the pivoting arms 14 together with the pressure roller 13 are pivoted rearwards, in order, with the full bale diameter, to reach the end position, represented by dot-and-dash lines in FIG. 1, in which the bands loop round the deflecting rolls 9 and 10 at a larger angle and the strand, curved rearwards, loops round virtually half the bale. In this end position, a bale-supporting roller 19 is also activated, this being mounted by means of brackets on the pivoting arms 14 approximately in the bending region of the latter. It supports the strand between the deflecting rolls 9 and 10 and at this point exerts an additional pressure force on the enlarged bale circumference.

In order to actuate the pivoting arms 14, the transverse tube 15 carries, on one side, a driving arm 20 which extends approximately at right angles to the portion of the pivoting arms 14 which is located near the axle. Articulated on this driving arm 20 is the end of the piston rod of a double-acting hydraulic lifting cylinder 21, the roller housing of which is fastened to the rear flap 4, as shown in FIG. 3. During the extension of the piston, the pivoting arms 14 assume the initial position and, during retraction, assume the end position represented by dot-and-dash lines. In this example, also for opening the rear flap 4 there is provided a double-acting lifting cylinder 22, of which the housing is articulated on the machine frame 2 and the piston on the rear flap 4.

The hydraulic circuit diagram according to FIG. 3 shows first of all that the two connecting lines 23 and 24 of the lifting cylinder 21 are connected to one another via a pressure-limiting valve 25. This pressure-limiting valve 25 is varied in its setting according to the position of the pivoting arms 14 by means of a component 29. It acts as a hydraulic brake, because the displacement of the hydraulic fluid from the chamber in front of the piston into the chamber behind the piston is throttled. The bale pressure can thus be adjusted in this way.

On the other hand, the two lifting cylinders 21 and 22 are connected in parallel to two lines 26 and 27 coming from a tractor 28 which draws the round-bale press. When the bale has reached the desired size and has been tied, the line 26 is put under pressure and the line 27 serves as a return. The result of this is that, on the one hand, the pivoting arms 14 are pivoted completely into their end position, if this has not yet occurred, and, on the other hand, the rear flap 4 opens.

When the bale is ejected, the line 27 is put under pressure and the line 26 made pressureless. Consequently, the rear flap 4 closes again and the pivoting arms 14 move into their initial position, so as to be ready for the formation of a new bale.

We claim:

1. A round-bale press for stalk-shaped crops, the press comprising:

a rearwardly conveying ground arrangement; a press-band arrangement having an upwardly travelling front strand; and a downwardly conveying front wall arrangement; said arrangements at least partially defining a press space in which a bale is formed, the press space, on a circumference thereof, being limited in a downward direction by the rearwardly conveying ground arrangement, in a rearward direction by the upwardly travelling front strand of the press-band arrangement, and in a forward direction by the downwardly conveying front wall arrangement;

wherein the press further comprises a rear flap which opens for ejection of a bale, the press-band arrangement being disposed in the rear flap, the rear flap having two rollers, a first roller being mounted at the top and a second roller being mounted at the bottom of the rear flap, the front strand stretching between the two rollers; and wherein the press further includes a pivoting arrangement comprising a transverse roller and two pivoting arms on which the transverse roller is rotatably mounted, the arms being pivotably mounted about a transverse axis of the press in a rearward lower portion of side walls of the rear flap, said pivoting arrangement operable to adjustably press the front strand in a forward direction at a location between the first and second rollers, so that at the start of bale formation, a lower section of the front strand, between the transverse roller and the second roller, inclines forward over the ground arrangement and forms an acute angle with the ground arrangement.

2. The round-bale press according to claim 1, wherein the downwardly conveying front wall arrangement comprises a plurality of rollers rotating in the same direction.

3. The round-bale press according to claim 1, wherein the pivoting arms have a bent shape and, at a bending point thereof, carry bearings for rotatably mounting a bale-supporting roller.

4. The round-bale press according to claim 1, wherein the pivoting arms are connected to a double-acting lifting cylinder which operates to adjust the position of the pivoting arms and thereby adjustably press the front strand during formation of a bale.

5. The round-bale press according to claim 4, wherein the pressing on the front strand is variable as a function of the position of the pivoting arms adjustment thereof being by way of a pressure-limiting valve associated with the lifting cylinder.

6. The round-bale press according to claim 4, wherein a driving circuit for the lifting cylinder is connected in parallel with a driving circuit for a further lifting cylinder, the further lifting cylinder being for opening and closing the rear flap.

7. In a round-bale press having a rearwardly conveying ground arrangement, a downwardly conveying front wall arrangement, and a press-band arrangement with an upwardly traveling front strand, wherein a substantially round bale is formed in a press space defined by the arrangements, a bale formation adjusting apparatus comprising:

supporting arms pivotably mounted at first ends thereof to a rear portion of the press, the arms being pivotable about a transverse axis of the press and directed toward a front portion of the press;

a transverse roller rotatably mounted between the supporting arms at corresponding second ends of the arms, for contacting and pressing in a forward direction on the front strand of the press-band arrangement; and actuating means, connected to the supporting arms, for pivoting the supporting arms to thereby adjust the pressing of the transverse roller on the front strand of the press-band arrangement.

8. The bale formation adjusting apparatus according to claim 7, wherein the actuating means comprises a double-acting lifting cylinder.

9. The bale formation adjusting apparatus according to claim 7, wherein the downwardly conveying front wall arrangement comprises a plurality of arcuately spaced rollers rotating in the same direction, wherein the rearwardly conveying ground arrangement comprises a plurality of horizontally spaced rollers rotating in the same direction, and wherein the front strand comprises at least one belt guided by a plurality of rollers, the belt moving in an opposite direction at the press space to the direction of rotation of the front wall and ground rollers.

10. The bale formation adjusting apparatus according to claim 9, wherein the round-bale press includes a pick-up means, disposed in front of the ground arrangement, for picking up the crop to be pressed into a bale and feeding it into the press-space.

11. The bale formation adjusting apparatus according to claim 7, wherein the supporting arms have a bent shape and, at a bending point thereof, are provided with a rotatably mounted bale-supporting roller.

12. The bale formation adjusting apparatus according to claim 7, wherein the round-bale press includes a rear flap, the press-band arrangement being disposed in the rear flap;

wherein the press-band arrangement comprises two rollers, a first roller being mounted at the top and a second roller being mounted at the bottom of the rear flap, the front strand stretching between the two rollers; and wherein the transverse roller contacts and presses the front strand of the press-band arrangement at a point between the first and second rollers.

* * * * *